US012372104B2

(12) United States Patent
Ebelt et al.

(10) Patent No.: US 12,372,104 B2
(45) Date of Patent: Jul. 29, 2025

(54) METHOD FOR INSTALLING A DEVICE FOR THE MONITORING OF A MACHINE HAVING A ROTATING MACHINE PART

(71) Applicant: KSB SE & Co. KGaA, Frankenthal (DE)

(72) Inventors: Gerd Ebelt, Frankenthal (DE); Thomas Paulus, Frankenthal (DE); Lenard Vorpahl, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 409 days.

(21) Appl. No.: 17/802,623

(22) PCT Filed: Feb. 24, 2021

(86) PCT No.: PCT/EP2021/054577
§ 371 (c)(1),
(2) Date: Aug. 26, 2022

(87) PCT Pub. No.: WO2021/170665
PCT Pub. Date: Sep. 2, 2021

(65) Prior Publication Data
US 2023/0107001 A1   Apr. 6, 2023

(30) Foreign Application Priority Data
Feb. 28, 2020  (DE) ..................... 10 2020 105 306.1

(51) Int. Cl.
*F15B 19/00* (2006.01)
*H04B 1/10* (2006.01)
(Continued)

(52) U.S. Cl.
CPC ......... *F15B 19/005* (2013.01); *H04B 1/1009* (2013.01); *H04L 67/12* (2013.01); *F15B 2211/857* (2013.01); *H04W 88/16* (2013.01)

(58) Field of Classification Search
CPC ............ F15B 19/005; F15B 2211/857; H04B 1/1009; H04L 67/12; H04W 88/16
See application file for complete search history.

(56) References Cited

U.S. PATENT DOCUMENTS

2002/0042290 A1* 4/2002 Williams ............. H04B 7/1555
455/562.1
2002/0058503 A1* 5/2002 Gutowski ............. H04W 24/00
455/67.11

(Continued)

FOREIGN PATENT DOCUMENTS

DE     102009054527 A1 *  6/2011  ............. H04L 12/66

OTHER PUBLICATIONS

International Search Report (PCT/ISA/210) issued in PCT Application No. PCT/EP2021/054577 dated May 27, 2021 with English translation (four (4) pages).

(Continued)

*Primary Examiner* — Joseph A Bednash
(74) *Attorney, Agent, or Firm* — Crowell & Moring LLP

(57) ABSTRACT

A method for installing a machine monitoring device which includes at least one gateway, at least one machine operation data sensor unit, a transmission unit having a transmission antenna for radio-based transfer of the machine operation data from the sensor unit to the gateway, and at least one user terminal for communication with the gateway. The antenna position is variable relative to the sensor and/or transmission units. The method steps include installing the gateway; establishing a communication link between the transmission unit and the gateway, positioning the transmission unit and antenna at or near the machine, transferring data packets to determine at least one communication parameter influencing the communication transfer quality, generating a position change instruction for the transmission unit or antenna and/or an action recommendation on the basis of the com- (Continued)

munication parameter, and displaying the instruction and/or recommendation at a user terminal.

17 Claims, 1 Drawing Sheet

(51) Int. Cl.
*H04L 67/12* (2022.01)
*H04W 88/16* (2009.01)

(56) References Cited

U.S. PATENT DOCUMENTS

| | | | |
|---|---|---|---|
| 2010/0101785 | A1 | 4/2010 | Khvoshchev et al. |
| 2017/0064621 | A1 | 3/2017 | Garg et al. |
| 2018/0149516 | A1 | 5/2018 | Wascat et al. |
| 2019/0387415 | A1 | 12/2019 | Schahill et al. |
| 2020/0056462 | A1* | 2/2020 | Xiao ............. H02K 1/2791 |
| 2021/0067412 | A1* | 3/2021 | Horne ............. H04W 24/02 |

OTHER PUBLICATIONS

German-language Written Opinion (PCT/ISA/237) issued in PCT Application No. PCT/EP2021/054577 dated May 27, 2021 (seven (7) pages).
German-language Search Report issued in German Application No. 10 2020 105 306.1 dated Feb. 16, 2021 with partial English translation (13 pages).

* cited by examiner

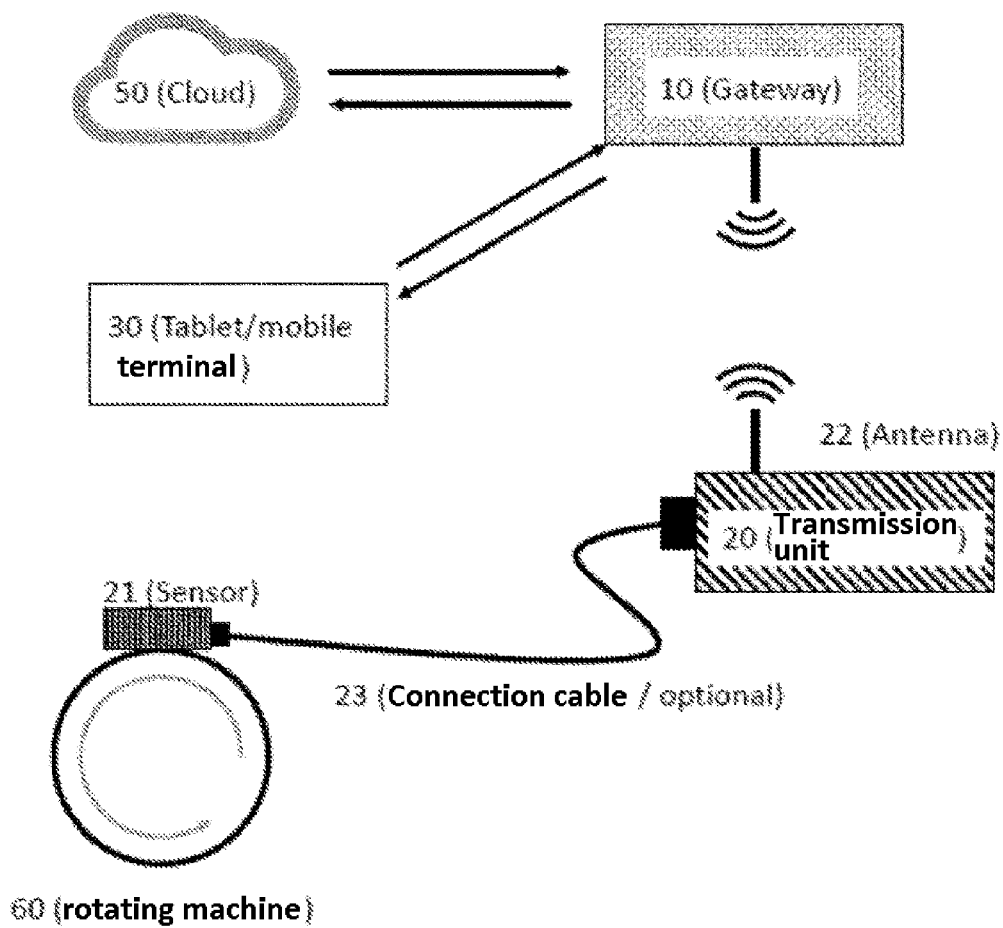

METHOD FOR INSTALLING A DEVICE FOR THE MONITORING OF A MACHINE HAVING A ROTATING MACHINE PART

BACKGROUND AND SUMMARY OF THE INVENTION

The invention relates to a method for installing a device for the monitoring of at least one machine with a rotating machine part.

The monitoring of individual components of a hydraulic system is an important and central topic. Various sensors are attached to the hydraulic components to be monitored, such as hydraulic pumps and motors, valves, etc., which measure different operating parameters of the components. For the evaluation and monitoring, the measured values must be transmitted to a central computer unit. It is common practice to use a gateway which communicates with the individual sensors via radio and then forwards the received measurement data to the central computer unit.

In larger industrial systems, it is often necessary to overcome long transmission distances between sensors and the gateway/computer unit. In addition, the radio transmission is also disturbed by other factors, such as obstructions located between the transmitter and receiver (steel beams, walls, etc.). The relative positioning of the individual transmitters with respect to the receiver is therefore critical. However, it is not possible either for experts or laypersons to predict whether reliable communication between the transmitter and receiver is guaranteed at the desired transmission installation site in the area of the pump or other equipment to be monitored. In the worst case, with modern solutions, it is only after the sensors and transmission units have been mounted and fixed at the installation site that the selected site is found to be unsuitable for communication with the gateway.

Based on the problem described above, the following describes a novel method for the installation of a monitoring device which is able to overcome the described problems.

The machine with the rotating part to be monitored is preferably a hydraulic machine, such as a hydraulic pump or centrifugal pump.

For the purpose of the method according to the invention a device is proposed which includes a gateway, a sensor unit for collecting machine operation data of the machine to be monitored, a transmission unit having a transmission antenna for the wireless transmission of the measured values recorded by the sensor unit to the gateway, and a user terminal for communication with the gateway. The special feature of the device is that the sensor unit and transmission unit, or at least the transmission antenna, are physically separate units that can be placed independently of each other on or in the area of the machine to be monitored. The transmission unit can be an integral part of the sensor unit. In this case, the transmission antenna is designed as a separate component which can be connected to the transmitter/sensor unit by a cable connection. This produces a certain flexibility in the arrangement of the transmission antenna. It is also conceivable that the transmission unit is designed as a module external to the sensor unit. In this case, the transmission unit is connected to the sensor unit by cable or other type of connection (also wirelessly). The transmission antenna is then either an integral part of the transmission unit or again designed as an external component, which is connected to the transmission unit by cable connection. Even though the above and the following always refer to a transmission unit and a transmission antenna, it should be noted at this point that the components can be suitable and configured for establishing a bidirectional communication.

Using such a device, the method having the following steps according to the invention is proposed:

In a first step the gateway is installed at the desired position. After the gateway has been installed, the at least one transmission unit is coupled to the gateway for communication and then the transmission unit and/or the transmission antenna is positioned at or in the area of the machine to be monitored. The communication connection between the gateway and the transmission unit is preferably established under optimum conditions, i.e. the transmission unit is first brought into the immediate vicinity of the gateway and only moved to the area of the machine to be monitored after successful establishment of the connection.

After the communication connection between the transmission unit and the gateway has been established, the data transmission begins, preferably from the transmission unit to the gateway. At least one communication parameter that influences the transmission quality of the communication path is then determined by means of a receiver-side analysis of the exchanged data. A subsequent evaluation of the communication parameter can then be used to draw conclusions as to the current reception quality. Based on this, a position change instruction can be generated for the transmitter site, i.e. the transmission unit and/or the transmission antenna. This instruction is then displayed for the user by means of the user terminal and/or by the transmission unit itself. This is designed to induce the user to change the current position of the transmission unit or the transmission antenna in such a way that an optimization of the relevant communication parameter, and ultimately an improvement in the transmission quality, is achieved.

In other words, the transmission unit or transmission antenna is thus not permanently installed immediately, but is first temporarily positioned at the intended installation site. The data transmission triggered then, preferably of test data, is continuously monitored in order to optimize the transmission quality on the communication link between transmission unit and gateway by changing the position of the transmission unit or transmission antenna.

In the simplest case, the generated position change instructions can include a global prompt to change the position. According to one possible embodiment, such an instruction can also contain further details for the position changes, e.g. the direction in which the transmitter should be moved or how its orientation should be changed. This provides the user with better guidance for the alignment and positioning of the transmission unit and/or transmission antenna.

It may also be provided that the user is informed as soon as a position with sufficient transmission quality has been found. Only once such an installation site has been found by means of the method is the transmission unit or transmission antenna permanently installed on or in the area of the component to be monitored. Subsequently or in parallel, the sensor unit can also be permanently installed on the monitored component and coupled to the transmission unit.

As an alternative to the position change instruction, however, the user can also be provided with an action recommendation. Such an action recommendation serves to further increase the transmission quality without or in addition to the position change.

According to the invention, position change instructions and/or action recommendations are signaled to a user terminal and displayed for the user by means of the device. Such a display is preferably visual, but can also be acoustic.

Of course, a purely acoustic and/or haptic display is also possible. In addition to the position change instruction and/or action recommendation, the determined communication parameter or the evaluation result can also be displayed. Examples of potential communication parameters are the signal reception level and/or a signal-to-noise ratio and/or a bit error rate.

The user terminal can be part of the transmission unit or the gateway. However, it is preferable to design the user terminal as a separate device that communicates with the gateway and exchanges the necessary data for display. The use of a mobile user terminal is particularly preferable, for example in the form of a commercially available tablet, smartphone, or other mobile device. An application installed on the user terminal interacts with the gateway. The communication link between the user terminal and the gateway is radio-based and preferably relies on a WLAN standard and/or BLUETOOTH™ standard.

The evaluation of the at least one communication parameter can preferably be performed by comparison with an assigned reference or threshold value. For example, if the parameter falls below the threshold value, inadequate communication conditions can be assumed, i.e. the threshold value represents a corresponding minimum requirement for the respective communication parameter. It is possible here to perform a comparison with a minimum signal strength for the signal received on the gateway side and/or a minimum signal-to-noise ratio and/or a maximum bit error rate.

A graphical presentation of the position change instructions could also be generated and displayed in the form of a so-called heat map. Such a two-dimensional representation gives a good overview of the reception quality over the spatial extent of the system area. It is also possible to use blink codes, warning tones, or applications in the field of augmented/virtual reality in order to present the instructions and measurement data as clearly as possible for the user.

The option to deliver an action recommendation by speech relates to a modification of the transmission and/or reception unit in accordance with an advantageous design. It is conceivable that the user is given a warning to use a different transmission antenna with a higher antenna gain. If the sensor unit and transmission unit/transmission antenna are spatially separated, a proposal could also be offered to use a longer connection cable between the sensor unit and transmission unit/transmission antenna in order to be allow more flexibility in the positioning of the transmission unit/transmission antenna.

According to a preferred embodiment, the communication between the gateway and the one or more transmission units is carried out using the mesh network technology. For example, a suitable communication protocol is THREAD. By setting up a mesh network consisting of a plurality of transmitters, repeaters and a plurality of gateways, the stability of the network can be increased and the range extended at the same time, because communication via multi-hop via intermediate repeaters also allows alternative communication paths to be set up. In this context, it is conceivable that communication parameters could be determined and evaluated both for the entire transmission link and for individual sub-sections.

In accordance with another preferable embodiment of the method, before the fixed installation of a transmission unit/transmission antenna the method is repeated for all possible sensors and installation points of the industrial system to be monitored. For the repeated execution of the method, it is sufficient to use a single transmission unit which is positioned sequentially in the area of the components to be monitored. As soon as a suitable installation site has been found for a component, the defined position is either marked on the component manually or else the corresponding positional data is stored electronically in a memory, in particular in conjunction with metadata to describe the installation site. In the latter case, after the completion of the method an installation plan or sketch can be automatically generated, which graphically displays all installation sites for all components. Such an installation plan could then be used electronically in conjunction with augmented/virtual reality to support the user virtually in the final positioning and fixing of the transmission units/transmission antennas/sensor units. In addition to the separate design of the sensor and transmission unit, it is also possible to relocate the power supply for the sensor into the transmission unit.

Possible designs of the sensors are used for recording temperature or vibration values.

The transmission unit and/or transmission antenna and, if applicable, the separate sensor unit can be fixed to the component to be monitored, for example, by means of a form-fitting, force-fitting, or materially-bonded connection. Possible installation sites for a sensor unit for pumps are the bearing support or the support stand.

In addition to the method according to the invention, the present invention also relates to a system consisting of at least one gateway, at least one sensor unit, a transmission unit having a transmission antenna and a user terminal, in particular a mobile user terminal, wherein the system components are configured to carry out the method according to the present invention. Preferably, the corresponding evaluation and assessment steps are carried out within the gateway or within the transmission unit. The gateway or the transmission unit also comprises a corresponding memory for depositing predefined thresholds and for storing the determined installation sites in conjunction with corresponding metadata.

The transmission unit can be an integral part of the sensor unit. In this case, the device comprises an external transmission antenna which is connected to the transmission unit by a cable connection. Ideally, the cable connection can be exchanged based on suitable interfaces to the antenna and transmission unit, in order to replace the connection by a longer cable if necessary. It is also conceivable for the sensor unit and the transmission unit to form separate components that can be connected to each other by means of cabling or also by radio, in particular for signal exchange. It is conceivable that an energy module necessary for the power supply of the sensor unit or the transmission unit is also designed as an external component. It is preferable to integrate the energy module into the transmission unit. In the design with an external transmission unit, this can either comprise an integral transmission antenna or be connected to an external transmission antenna or be connected by cable.

For the pump monitoring, sensors that can detect temperatures and/or mechanical vibrations and/or acoustic signals are suitable.

Other objects, advantages and novel features of the present invention will become apparent from the following detailed description of one or more preferred embodiments when considered in conjunction with the accompanying drawings.

BRIEF DESCRIPTION OF THE DRAWINGS

The single FIGURE is a schematic illustration of an embodiment of the present invention.

DETAILED DESCRIPTION

The single FIGURE shows a schematic overview of an embodiment of the device according to the invention for monitoring one or more hydraulic pumps 60. The device comprises a central gateway 10 which is connected for communication to one or more transmission units 20. The FIGURE shows only the transmission unit 20 by way of example, but in fact any number of transmission units 20 can be integrated into the network. Communication between gateway 10 and transmission unit 20 can be based on the well-known thread protocol for setting up a mesh network, in which transmission units 20 can both communicate with each other as well as with the gateway unit 10.

Access to the gateway 10 from outside can be made via a commercially available tablet or other mobile terminal 30 (user terminal). For communication, a radio standard such as WLAN or BLUETOOTH™ is used, which is supported by most commercially available terminals. In addition, the gateway 10 can be connected to the internet or a cloud 50 via another interface. For this purpose, the gateway ideally has a mobile radio module that supports at least one of the well-known mobile radio standards such as 2G, 3G, 4G, 5G or higher, or a wired Ethernet interface.

The following text gives a brief description of a typical method sequence used in the site verification during commissioning of such a monitoring device. In the concrete example, an industrial system having a plurality of hydraulic pumps to be monitored separately will be equipped with the monitoring device. The aim is to install one or more sensors 21 per pump 60, which are able, for example, to measure the temperature of the conveyed medium as well as the occurrence of mechanical vibrations in the area of the bearing support. The sensors 21 are each connected via a detachable cable connection 23 to an assigned separate transmission unit 20, which in addition to the transmission module and antenna 22 for communication with the gateway 10 also contains the energy source for the transmission unit 20 and sensor 21 itself.

The sensors 21 can be attached to the bearing support of the hydraulic pump 60 either magnetically, by means of a screw connection or by gluing using industrial glue. The same applies to the installation of the transmission unit 20 on the pump 60 or in the immediate vicinity of the pump 60. Especially in the case of a material-compatible connection, a careful selection of the appropriate installation site is obviously important. For this reason, before the sensor 21 and the transmission unit 20 are finally fixed, the method according to the invention is carried out in order to find out the best installation location.

In a first step, the gateway 10 is commissioned and access to the gateway 10 is established via mobile terminal 30. To do this, an application installed on the terminal 30 is first started, which is used to establish a logical connection with the gateway 10. Using the application that is running, the wireless reception of the gateway 10 can then be tested to first determine an optimal gateway location for the wireless reception, which of course should also be in the vicinity of the transmission units 20 to be installed, and finally to install the gateway 10 in the best location.

This is followed by the communication connection of at least one transmission unit 20 to the gateway 10. To do this, the transmission unit is placed near the gateway 10 and activated there. Using the terminal and the application running there, a setup process is performed to establish communication between the gateway 10 and the transmission unit 20. The display of the application on the mobile terminal 30 now shows the current signal strength, i.e. the signal quality of the communication signal transmitted from the transmission 20 to the gateway 10. By matching with a defined minimum signal strength, which is stored in the memory of the gateway 10 as a threshold value, the user is signaled on the terminal 30 whether the current signal quality is sufficient for smooth communication between the transmission 20 and gateway 10.

The user now assigns a name in the application for the desired installation location or the pump to be monitored, e.g. Pump 1. The transmission unit 20 is then moved into the area of Pump 1 and temporarily held or positioned at a possible installation point. After checking the reception value in the application of the terminal, the user can now determine whether the desired installation location is suitable for implementing reliable communication between transmission unit 20 and gateway 10. The display is in graphical form with the corresponding status colors red, yellow, green for the evaluation of the reception quality. Once a suitable installation location has been found, it can be physically marked at the pump or at another suitable location nearby in the building or also in the application on the terminal.

If the required minimum signal quality cannot be achieved in the vicinity of the pump 60 to be monitored, this installation site must either be excluded or possible recommendations for action be given to the installer. For example, the transmission unit 20 can be moved by means of an extension cable for connection 23 to a location further away from the pump 60 where sufficient signal quality is indicated. Alternatively, the location or characteristic of the gateway antenna could be modified.

The method is then repeated for the next pump or installation site, using the same or an additional transmission unit 20. As before, the transmission unit 20 is then moved to the area of the second pump and an identical installation location is determined. If all installation locations have been determined according to the procedure according to the invention, the gateway 10 can create an installation plan based on the respective saved installation locations and display it to the user.

For the fixed installation of the individual transmission units 20 and sensor units 21, the respective transmission unit 20 is then connected to the assigned sensor unit 21 via cable 23 and confirmed by a response in the application on the terminal device 30. The sensor 21 can then be installed. This can be carried out using the stored position data as well as other image data of the industrial plant, if necessary in connection with an augmented/virtual reality application, by matching the image of the respective pump with a database and displaying the installation site to the user via an augmented/virtual reality application.

Once the pump has been created in the gateway 10 or the application, an association between sensor 21 and pump can be created in the cloud 50. Subsequently, the transmission unit 20, which is also installed, is put into operation with the sensor head 21 connected and the application gives a feedback signal when the transmission unit 20 with sensor 21 has been successfully detected. For the test, an initial measurement is automatically triggered and measured values determined are displayed in the application.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for installing a device for monitoring of at least one machine having a rotating machine part, the device consisting of at least one gateway, at least one sensor unit configured to collect machine operation data of the at least one machine, at least one transmission unit having a transmission antenna configured to conduct radio-based transfer of the machine operation data collected by the at least one sensor unit to the at least one gateway, wherein the at least one transmission unit and the transmission antenna are positioned at or in a region of at least one machine and at least one user terminal configured to communicate with the at least one gateway, wherein a position of the transmission antenna relative to one or both of the at least one sensor unit and the at least one transmission unit being variable, the method comprising the steps of:
   a. installing the at least one gateway;
   b. establishing a communication link between the at least one transmission unit and the at least one gateway;
   c. transferring data packets between the at least one transmission unit and the at least one gateway using the communications link;
   d. determining from the transferred data packets at least one communication parameter associated with a transmission quality on the communication link;
   e. generating one or both of a position change instruction for one or both of the at least one transmission unit and the transmission antenna, and an action recommendation for the user on the basis of the at least one communication parameter; and
   f. presenting the one or both of the position change instruction and the action recommendation using the user terminal; and
   g. carrying out steps b-f repeatedly with a transmission unit for different installation locations and for different machines to be monitored, wherein
      the at least one communication parameter is selectable from a signal reception level, a signal-to-noise ratio, and a bit error rate.

2. The method as claimed in claim 1, wherein the at least one machine includes at least one hydraulic pump.

3. The method as claimed in claim 1, wherein the displaying step includes displaying the position change instruction, the action recommendation, the at least one communication parameter or a combination thereof on a mobile user terminal.

4. The method as claimed in claim 3, wherein the communication link uses one or both of WLAN and a Bluetooth standard.

5. The method as claimed in claim 4, wherein the transmission quality determining step includes comparing the at least one communication parameter with a predetermined threshold value stored in a memory.

6. The method as claimed in claim 5, wherein the presenting step includes presenting the position change instruction as one or both of an optical user guidance and an acoustic user guidance in the form of a heat map, a blink code, a warning tone, an augmented/virtual reality application, or a combination thereof.

7. The method as claimed in claim 5, wherein the generating step includes generating the action recommendation as one or both of a replacement of the transmission antenna by an antenna with a higher antenna gain and the use of an extension cable one of both of between the at least one transmission unit and the at least one sensor unit and between the at least one transmission unit and the transmission antenna.

8. The method as claimed in claim 1, wherein
the communication link is established on a mesh network, and
the communication link includes communication via at least one further transmission unit or repeater.

9. The method as claimed in claim 1, wherein
the at least one transmission unit includes respective transmission units for one or both of different installation sites and different machines, the method further comprising:
a position with the highest reception quality of each of the respective transmission units is stored.

10. The method as claimed in claim 8, wherein
the stored highest reception quality positions are visually displayed on the at least one user terminal at a part of an installation plan.

11. The method as claimed in claim 2, wherein
the at least one sensor unit is positioned and fixed to a bearing support or a support stand of the at least one hydraulic pump,
one or both of the at least one transmission unit and the transmission antenna is arranged at an installation site on or near the at least one hydraulic pump, and
one or more of the at least one sensor unit, the at least one transmission unit and the transmission antenna are positioned with a form-fitting, force-fitting or bonded connection.

12. The method as claimed in claim 1, wherein
the at least one communication parameter is one or more of a signal reception level, a signal-to-noise ratio, and a bit error rate.

13. A machine monitoring system, comprising:
at least one gateway;
at least one transmission unit;
a transmission antenna, wherein the at least one transmission unit and the transmission antenna are positioned at or in a region of at least one machine; and
a user terminal,
wherein the machine monitoring system is configured to establish a communication link between the at least one transmission unit and the at least one gateway,
transfer data packets between the at least one transmission unit and the at least one gateway using the communications link,
determine from the transferred data packets at least one communication parameter associated with a transmission quality on the communication link,
generate one or both of a position change instruction for one or both of the at least one transmission unit and the transmission antenna, and an action recommendation for the user on the basis of the at least one communication parameter; and
present the one or both of the position change instruction and the action recommendation using the user terminal, wherein
the position, the transfer, the determine, the generate, and the present are repeated with a transmission unit for different installation locations and for different machines to be monitored, and
the at least one communication parameter is selectable from a signal reception level, a signal-to-noise ratio, and a bit error rate.

14. The system as claimed in claim 13, wherein
a position of the transmission antenna relative to one or both of the at least one sensor unit and the at least one transmission unit is variable.

15. The method as claimed in in claim 11, wherein
the at least one transmission unit is integral with the at least one sensor unit and the transmission antenna is connected to the transmission unit by cable, or
the at least one transmission unit is external to the at least one sensor unit and is connected to the at least one sensor unit by cable and the transmission antenna is integrated into the at least one transmission unit or is connected to the at least one transmission unit by a cable connection.

16. The system as claimed in claim 14, wherein
the at least one transmission unit is integral with the at least one sensor unit and the transmission antenna is connected to the transmission unit by cable, or
the at least one transmission unit is external to the at least one sensor unit and is connected to the at least one sensor unit by cable and the transmission antenna is integrated into the at least one transmission unit or is connected to the at least one transmission unit by a cable connection.

17. The system as claimed in claim 13, wherein
at least one sensor of the sensor unit includes a vibration sensor, an acoustic sensor, a temperature sensor, or a combination thereof.

* * * * *